(12) United States Patent
Viscardi

(10) Patent No.: US 11,780,037 B2
(45) Date of Patent: Oct. 10, 2023

(54) GRIPPING MACHINE FOR ARTICLES

(71) Applicant: COSBERG S.P.A., Terno d'Isola (IT)

(72) Inventor: Gianluigi Carlo Viscardi, Bergamo (IT)

(73) Assignee: COSBERG S.P.A., Terno d'Isola (IT)

(*) Notice: Subject to any disclaimer, the term of this patent is extended or adjusted under 35 U.S.C. 154(b) by 310 days.

(21) Appl. No.: 17/311,951

(22) PCT Filed: Dec. 11, 2019

(86) PCT No.: PCT/IB2019/060645
§ 371 (c)(1),
(2) Date: Jun. 8, 2021

(87) PCT Pub. No.: WO2020/121209
PCT Pub. Date: Jun. 18, 2020

(65) Prior Publication Data
US 2022/0063034 A1     Mar. 3, 2022

(30) Foreign Application Priority Data
Dec. 12, 2018   (IT) .................... 102018000011024

(51) Int. Cl.
*B23Q 3/00*     (2006.01)
*B23Q 1/62*     (2006.01)
(Continued)

(52) U.S. Cl.
CPC .............. *B23Q 1/621* (2013.01); *B23Q 3/06* (2013.01); *B23Q 17/005* (2013.01)

(58) Field of Classification Search
CPC . B23Q 1/621; B23Q 1/00; B23Q 3/06; B23Q 3/00; B23Q 17/005; B25B 11/00; B25B 11/002
See application file for complete search history.

(56) References Cited

U.S. PATENT DOCUMENTS 6,955,345 B2* 10/2005 Kato .................... B23Q 1/5437
                                                269/61
7,815,177 B2* 10/2010 Holliger ................ B23P 19/041
                                                269/37
(Continued)

FOREIGN PATENT DOCUMENTS

EP        2014410 A1    1/2009

OTHER PUBLICATIONS

Office Action for Chinese Application No. 201980082233.1.
(Continued)

*Primary Examiner* — Lee D Wilson
(74) *Attorney, Agent, or Firm* — Ferguson Case Orr Paterson

(57) ABSTRACT

A gripping machine for an article includes a machine frame, first and second drive means associated with the machine frame, a support platform of the article, movable with respect to the machine frame by the first drive means along a direction of displacement, and holding members, arranged about the direction of displacement to delimit therebetween a gripping plane or space of the article, at least one holding member being movable radially by the second drive means between a holding configuration and a release configuration of the article, and vice versa. Electronic control means control the first drive means so that the support platform is located at one or more predefined axial positions and the second drive means so that, in the holding configuration, at least one holding member is moved continuously towards the article to actively clamp the article.

16 Claims, 8 Drawing Sheets

(51) Int. Cl.
    *B23Q 3/06*     (2006.01)
    *B23Q 17/00*    (2006.01)

(56) References Cited

U.S. PATENT DOCUMENTS

| | | | |
|---|---|---|---|
| 9,700,976 B2 * | 7/2017 | Gao | B23Q 3/062 |
| 9,896,308 B2 * | 2/2018 | Nelson | B01D 53/8631 |
| 10,919,129 B2 * | 2/2021 | Omry | B25H 1/04 |
| 11,179,834 B2 * | 11/2021 | Zhou | B25B 27/0028 |
| 2002/0060386 A1 | 5/2002 | Konieczny | |
| 2010/0187776 A1 | 7/2010 | Speer et al. | |
| 2022/0063034 A1 * | 3/2022 | Viscardi | B23Q 1/621 |

OTHER PUBLICATIONS

International Search Report, issued in PCT/IB2019/060645, dated May 11, 2020, Rijswijk, Netherlands.
Written Opinion, issued in PCT/IB2019/060645, dated May 11, 2020.
Italian Search Report, issued in 201800011024, dated Jun. 25, 2019.

* cited by examiner

GRIPPING MACHINE FOR ARTICLES

CROSS-REFERENCE TO RELATED APPLICATIONS

This application is a National Phase Application of PCT International Application No. PCT/IB2019/060645, having an International Filing Date of Dec. 11, 2019 which claims the benefit of priority to Italian Patent Application No. 102018000011024, filed Dec. 12, 2018, each of which is hereby incorporated by reference in its entirety.

FIELD OF THE INVENTION

The present invention concerns an article gripping machine.

BACKGROUND OF THE INVENTION

An extremely common problem in industrial machining concerns the positioning and holding of workpieces with different geometries and dimensions.

By way of example, in a machine tool that has to be able to work all the workpieces at the height of its spindle, changing the format of a workpiece to be machined involves delays in machining, since it is necessary to adjust the height and/or stroke of the clamping jaws.

From document US2002060386A1 a device is known for clamping an elongated workpiece for its machining, in particular for clamping workpieces with a predominant longitudinal axis. This known device comprises a conveyor arranged to convey the workpiece along a path to a workstation, the path being generally parallel to the longitudinal axis of the workpiece. Said device further comprises a pair of elongated clamping elements generally oriented parallel and across the path, as well as a plurality of fork-shaped elements. These fork-shaped elements are spaced along the path and each of them has a pair of uprights. Each of the uprights is rotatably articulated at one of the elongated clamping elements, so that the elongated clamping elements are supported exclusively by the fork-shaped elements. An actuator is operatively connected to each of the fork-shaped elements, so that, in response to the operation of the actuator, the clamping elements are movable in unison between a first position wherein each clamping element is arranged away from the path and a second position wherein each of the clamping elements is moved towards the path, clamping and centering the workpiece on the workstation.

This known solution, suitable for elongated workpieces, has several drawbacks. First of all, with the rotation of the fork-shaped elements, the clamping elements are made to advance along the direction of the extension of the path and at the same time towards the workpiece. This double direction of displacement always creates a twist at the point of contact with the workpiece, which for workpieces with an elongated shape in the direction of the path does not cause any particular inconvenience, but which is unacceptable for other pieces, such as for example workpieces of similar dimensions in two mutually orthogonal directions.

Furthermore, this known solution allows the workpiece to be grasped only along opposite sides of the workpiece and along lines or planes, therefore it is absolutely unsuitable for workpieces of complex shape that do not have grasping planes opposing each other.

SUMMARY OF THE INVENTION

The present invention is part of the context above, and its aim is to provide an extremely versatile machine for adapting to articles of different sizes, capable of modifying its positioning and holding parameters in a substantially universal manner.

This aim is achieved by a gripping machine as described and claimed herein. Preferred variant embodiments are also described.

BRIEF DESCRIPTION OF THE DRAWINGS

The subject-matter of the present invention will now be described in detail, with the help of the accompanying figures, wherein:

FIGS. 1, 2, 3 represent, respectively, a perspective view and two plan views of a machine that is the subject-matter of the present invention, in accordance with a possible embodiment, whereas FIGS. 1 and 2 show a release configuration of the holding members, while FIG. 3 shows a holding configuration thereof;

DETAILED DESCRIPTION

Figure 1:
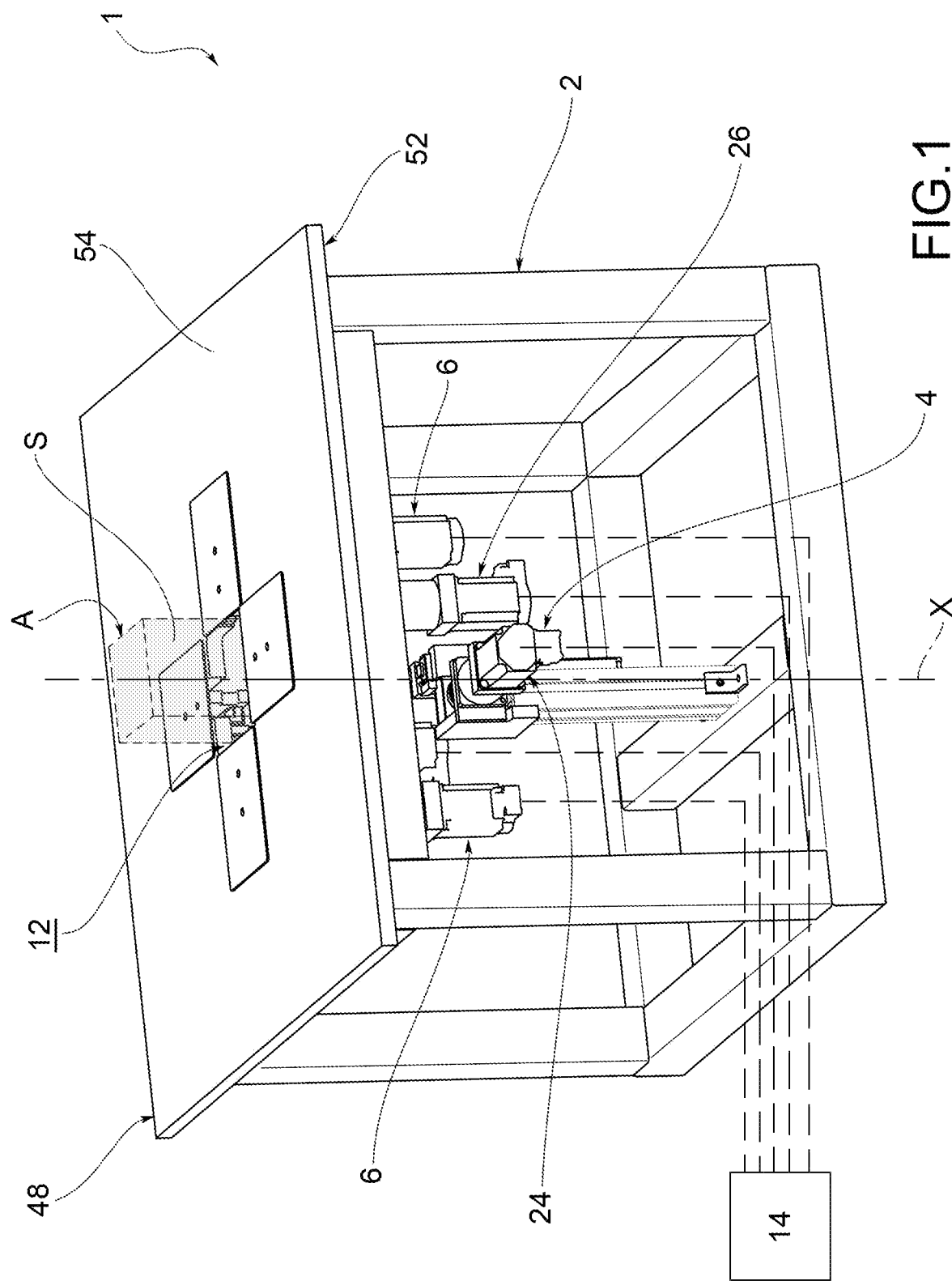
Figure 2:
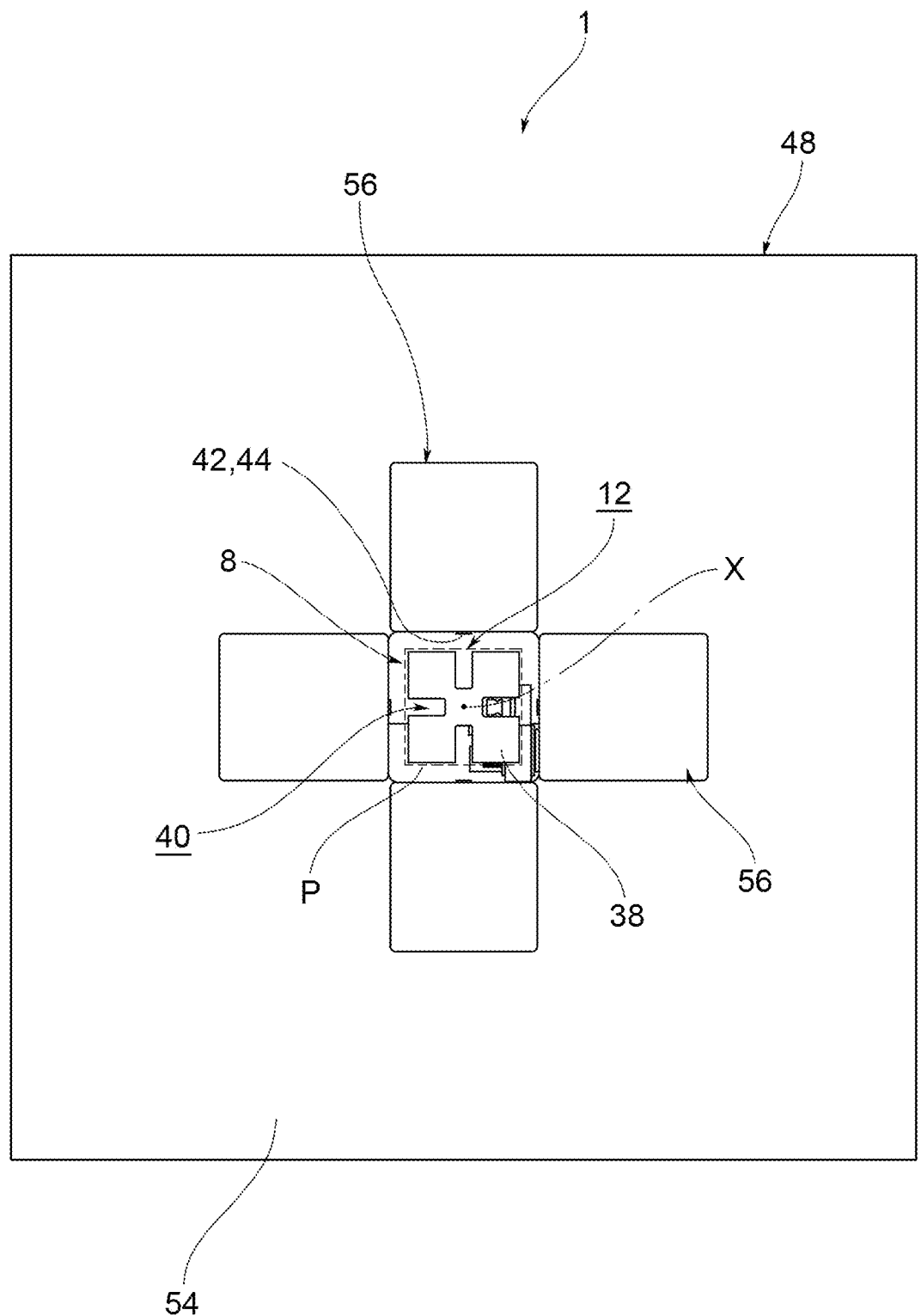
Figure 3:
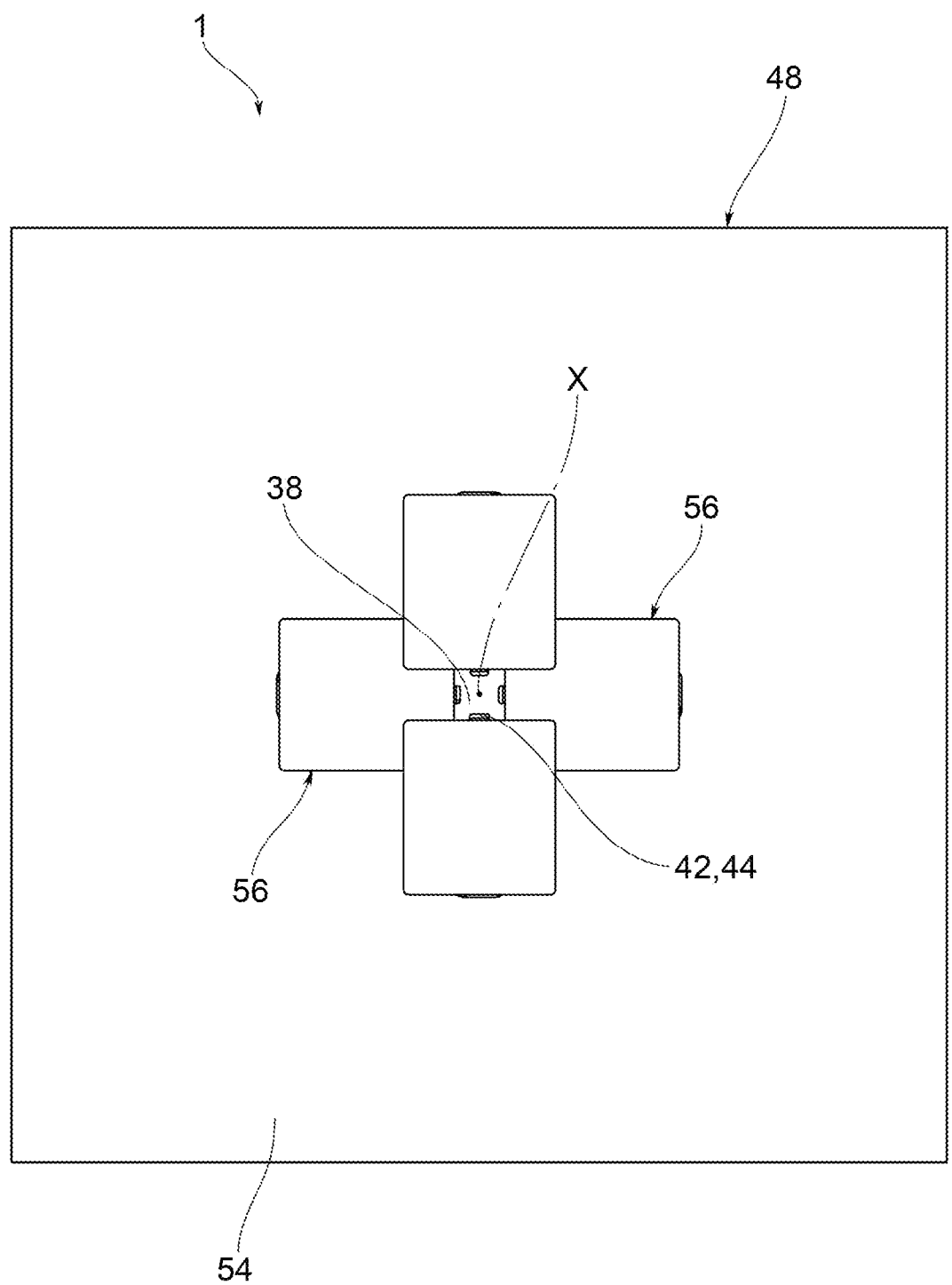

In accordance with a general embodiment, a gripping machine 1 for an article comprises at least one machine frame 2.

Said gripping machine 1 further comprises first 4 and second 6 drive means associated with said frame 2.

Said gripping machine 1 further comprises a support platform 8 of the article A which is movable with respect to the machine frame 2 by means of the first drive means 4 along a direction of displacement X.

Said gripping machine 1 further comprises holding members 10, suitable for delimiting therebetween a gripping plane or space 12 of the article A, and at least one of which is movable by means of the second drive means 6, between a holding configuration and a release configuration of the article A, and vice versa.

Advantageously, said holding members 10 are arranged about the direction of displacement X.

Furthermore, said at least one of said movable holding members 10 is movable only radially with respect to said direction of displacement X.

Additionally, electronic control means 14 are configured to control the first drive means 4 so that the support platform 8 is located at one or more predefined axial positions, and to control the second drive means 6 so that—in the holding configuration—at least one holding member 10 is moved continuously towards the article A to actively clamp it.

In accordance with an embodiment, said at least one holding member 10, movable only radially with respect to said direction of displacement X, is replaced by at least two holding members 10, movable in directions converging with each other.

In accordance with an embodiment, said at least one holding member 10, movable only radially with respect to said direction of displacement X, are two holding members 10, movable according to radial directions converging with each other.

In accordance with an embodiment, said at least one holding member 10, movable only radially with respect to said direction of displacement X, are two holding members 10, movable according to directions radial and orthogonal to each other.

In accordance with an embodiment, said machine comprises at least one working plane 48, supported by the machine frame 2, which delimits a plane hole or opening 50 at least partially overlapping the gripping plane or space 12. The support platform 8 is arranged at a lower height or lower surface 52 than the working plane 48 and has a stroke selected so as to move the article A through the plane opening 50. A plurality of different holding members 10 may be moved along convergent working directions L.

With reference to the aforesaid figures, a gripping machine for an article A is indicated collectively at reference number 1.

Figure 4:
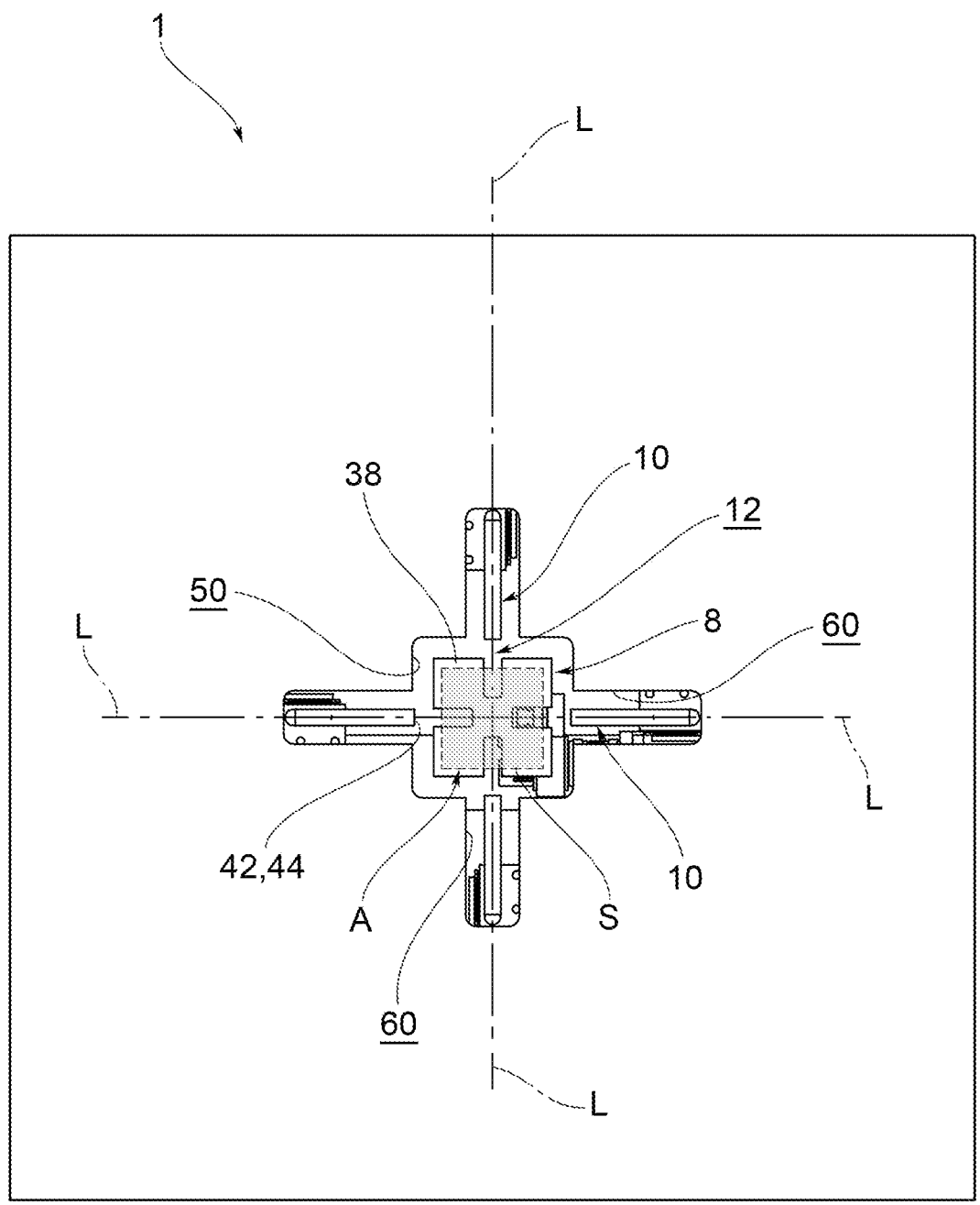
FIG. 4 shows a plan view similar to FIG. 2, where the protective elements have been removed for greater clarity.
Figure 5:
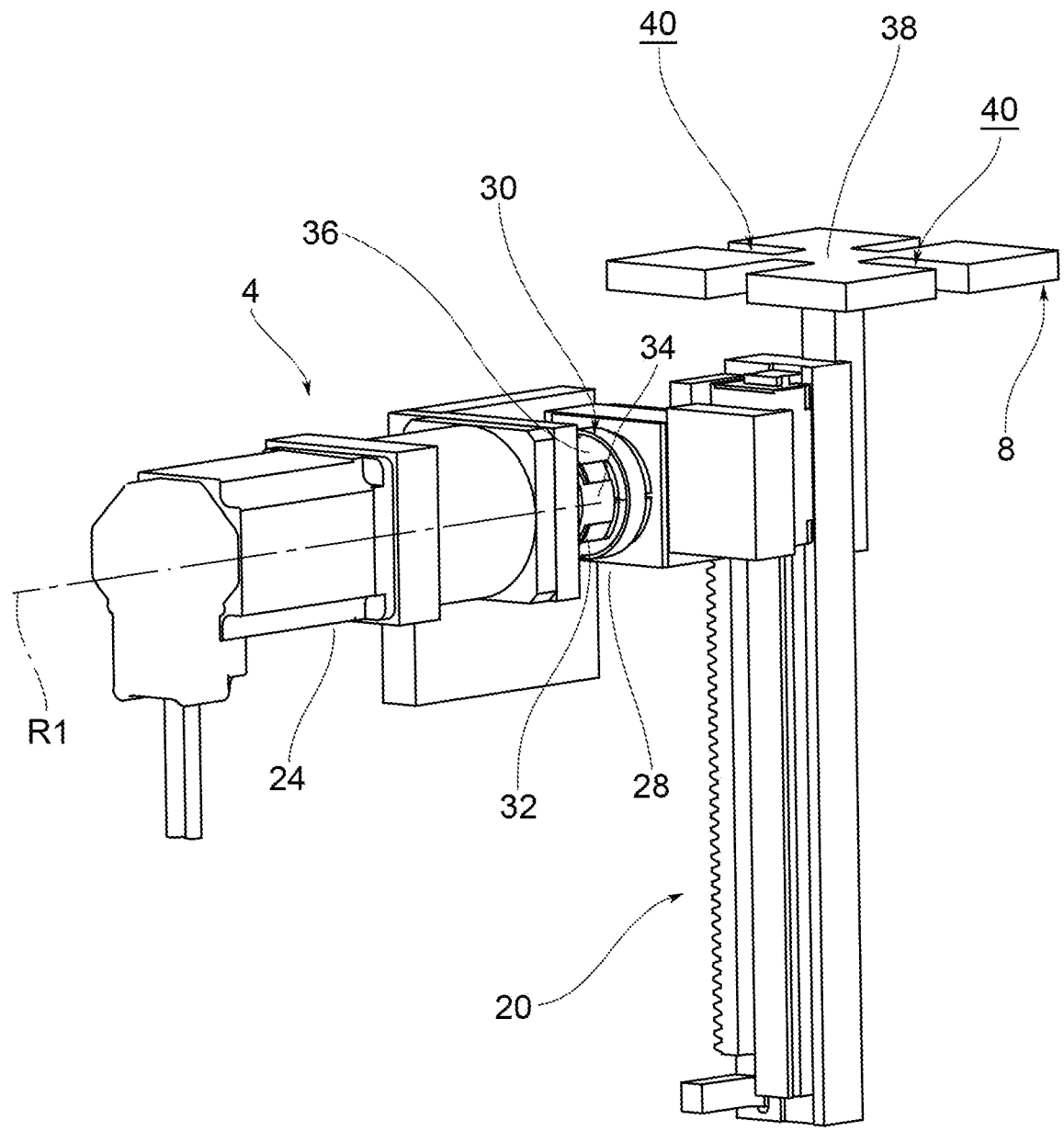
FIGS. 5, 6 illustrate two perspective views of the first drive means, the transmission and the support platform in two limit axial positions of the platform.

This article is only shown schematically in FIG. 1 and FIG. 4, since, for the objects of the present invention, both the nature of this article and the machining or operation that must be carried out thereon subsequent to holding by means of the present machine are irrelevant.

The gripping machine 1 comprises a machine frame 2, first drive means 4 and second drive means 6 associated with the frame 2, a support platform 8 of the article A, holding members 10 and electronic control means 14 (the latter only shown in FIG. 1).

In accordance with one embodiment, the gripping machine 1 could be movable by means of rolling members (not illustrated) connected to the machine frame 2.

In accordance with an embodiment, the electronic control means 14 could comprise a PC/PLC unit, or at least a microprocessor.

In accordance with an embodiment, the first drive means 4 and/or the second drive means 6 comprise one or more brushless motors.

The support platform 8 is movable with respect to the machine frame 2 by means of the first drive means 4 along a direction of displacement X.

In the embodiments shown, the direction of displacement X is substantially vertical. Therefore, in accordance with this variant, the first drive means 4 are likely to move the support platform 8 to different heights.

One should note that in the present description the expressions "axial" or "radial" will refer to the direction of displacement, unless otherwise specified.

The expressions "inner" or "outer" shall be understood as relating to a position radially closer to the direction of displacement X, or radially further away.

In some embodiments, the expressions "upper" or "lower" will refer to the orientation shown in FIG. 1, wherein the direction of displacement is substantially vertical.

The holding members 10 are arranged around the direction of displacement X (specifically: they are distributed radially about that direction X) in such a way as to delimit between them a gripping plane or space 12 of the article A.

In accordance with an embodiment, the holding members 10 operate in a single gripping plane 12.

In accordance with an embodiment, the gripping plane or space 12 develops in a direction orthogonal to the direction of displacement.

At least one of the holding members 10 is movable radially (for example: with respect to the machine frame 2) by means of the second drive means 6, between a holding configuration and a release configuration of the article A, and vice versa.

As a result, the second drive means 6 are capable of moving at least one holding member 10, for example a part of these members, optionally all the holding members 10 provided in the machine.

In accordance with an embodiment, one or more holding members 10 are mounted displaceable with respect to the machine frame 2, along substantially radial working directions L.

In accordance with the embodiments shown, the gripping machine 1 comprises four holding members 10, for example arranged at 90° to each other.

According to other embodiments, the gripping machine 1 might consist of three holding members 10, for example, arranged at 120° from each other, or two holding members 10, for example mutually opposed.

Nevertheless, the simplest variant of this machine provides for a fixed holding member, integral with the machine frame 2, and a holding member movable with respect to the fixed holding member.

In accordance with an embodiment, the number of second drive means 6 is equal to the number of movable holding members 10.

In accordance with an embodiment, in the holding configuration, at least part of the holding members 10 is in abutment with a surface S of the article A, for example with an outer surface S of the latter.

In accordance with an embodiment, in the release configuration, at least one holding member 10 is spaced away from the surface S.

The electronic control means 14 are configured to control the first drive means 4 so that the support platform 8 is located at one or more predefined axial positions.

In accordance with an embodiment, the electronic control means 14 comprise data storage means of one or more predefined axial positions of the article A or of a plurality of articles.

It follows that, according to this variant, the first drive means 4 (and, according to the same logic, also the second drive means 6) will be controlled according to the signals or information of the data storage means.

In accordance with an embodiment, the aforesaid one or more predefined axial positions is a function of the physical parameters of the article (for example, the height, width and/or depth thereof, and/or the hardness and/or material of which this article A is made).

In accordance with an embodiment, the holding configuration of the holding member is a function of the physical parameters of the article, for example the parameters mentioned in the preceding paragraph.

The electronic control means 14 are further configured to control the second drive means 6 so that—in the holding configuration—at least one holding member 10 is continuously moved towards the article A to actively clamp it.

It should be pointed out here that the holding configuration according to the invention does not involve a mere support of the holding member on the article, and a subsequent stopping of the second drive means 6, but rather the "active clamping" is carried out through the exercise of a force or an uninterrupted pressure of at least one movable holding member 10 (for example of all the movable members 10) on the aforementioned surface S, initiated by the second drive means 6.

It follows that the grip of the article A with the present machine 1 is particularly secure.

In accordance with an embodiment, the electronic control means 14 are configured to detect the holding configuration of the article A based on the current consumed by the second drive means 6.

In effect, when a movable holding member 10 is moved from the release configuration to the holding configuration in a free manner, in the absence of impediments, the current absorbed will be lower than when this member 10 comes in abutment with the article in the holding configuration. In the latter situation, there will be a high current consumption due to the impediment posed by the article itself.

In accordance with an embodiment, the gripping machine comprises a plurality of holding members 10, each moved by its own second drive means 6.

In accordance with an embodiment, the electronic control means 14 are configured to independently control the plurality of second drive means 6, so that the stroke (or displacement) of each holding member 10 between the release configuration and the holding configuration is individually adjustable.

In accordance with an embodiment, the gripping machine 1 comprises a plurality of movable holding members 10, where the electronic control means 14 are configured to control the second drive means 6 in a relationship of mutual dependence, so that the stroke of the holding members 10 between the release configuration and the holding configuration is symmetrical with respect to the direction of displacement X, or with respect to a plane of symmetry accommodating the direction of displacement X.

In accordance with an embodiment, the gripping machine could comprise second drive means 6 common to at least one pair of holding members 10. Optionally, this pair of members 10 could be connected through a symmetrical motion kinematic mechanism operated by the second drive means 6.

In accordance with an embodiment, the first drive means 4 comprise a first drive shaft rotatable about a first axis of rotation R1.

In accordance with an embodiment, the first axis of rotation R1 is oriented radially or tangentially with respect to the direction of displacement X.

In accordance with an embodiment, one or more second drive means 6 comprise a second drive shaft rotatable around a second axis of rotation R2.

In accordance with an embodiment, the second axis of rotation R2 is oriented parallel to the direction of displacement X.

In accordance with an embodiment, the first 4 and/or second 6 drive means comprise at least one transmission with rack 20, 22 and pinion 16, 18 kinematic mechanism.

Figure 6:
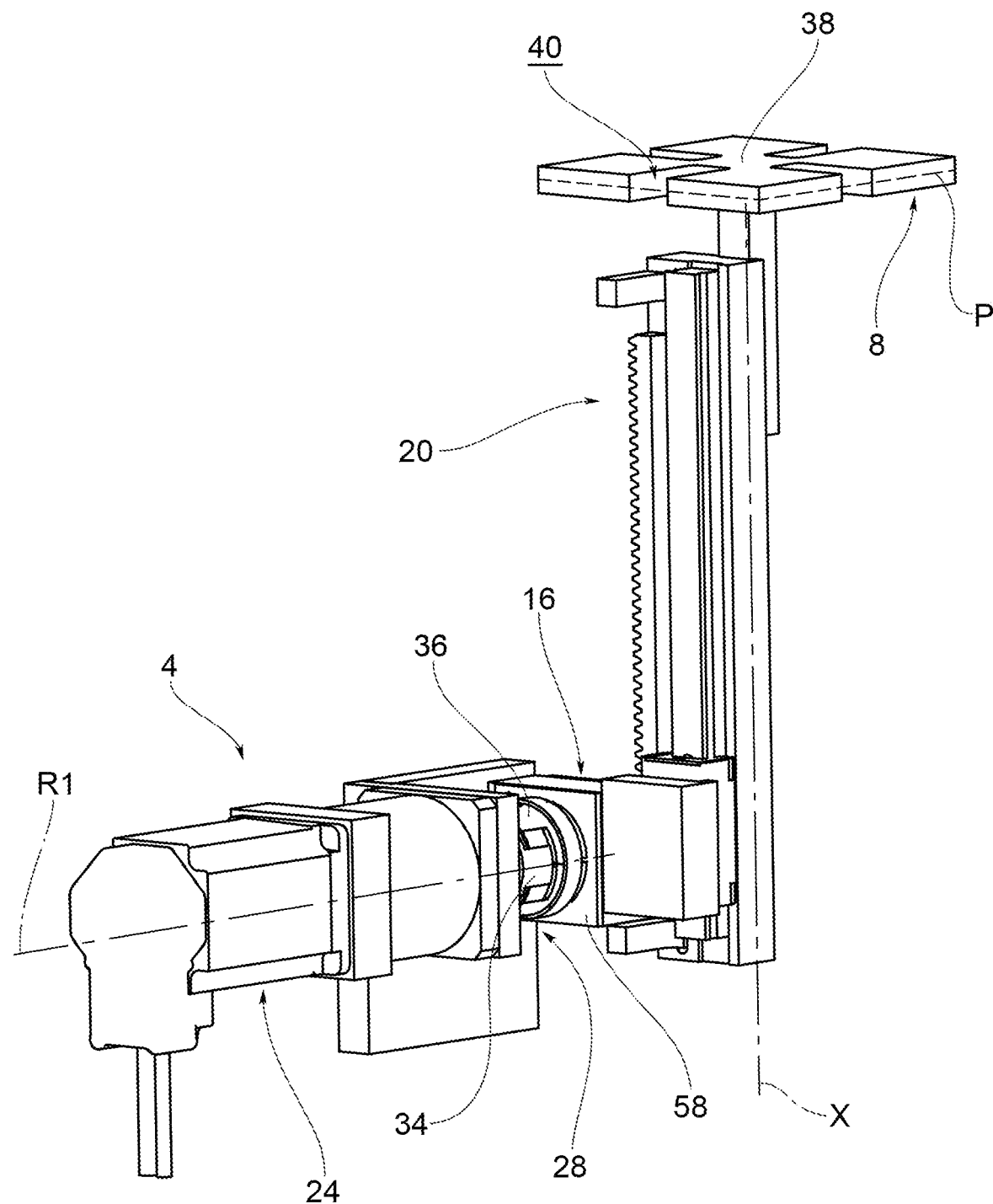

More precisely, in accordance with an embodiment, a first pinion 16 of the first drive means 4—arranged at the rear and thus hidden by the flange 58 in FIG. 6—engages a first rack 20 fixed to the support platform 8.

Figure 7:
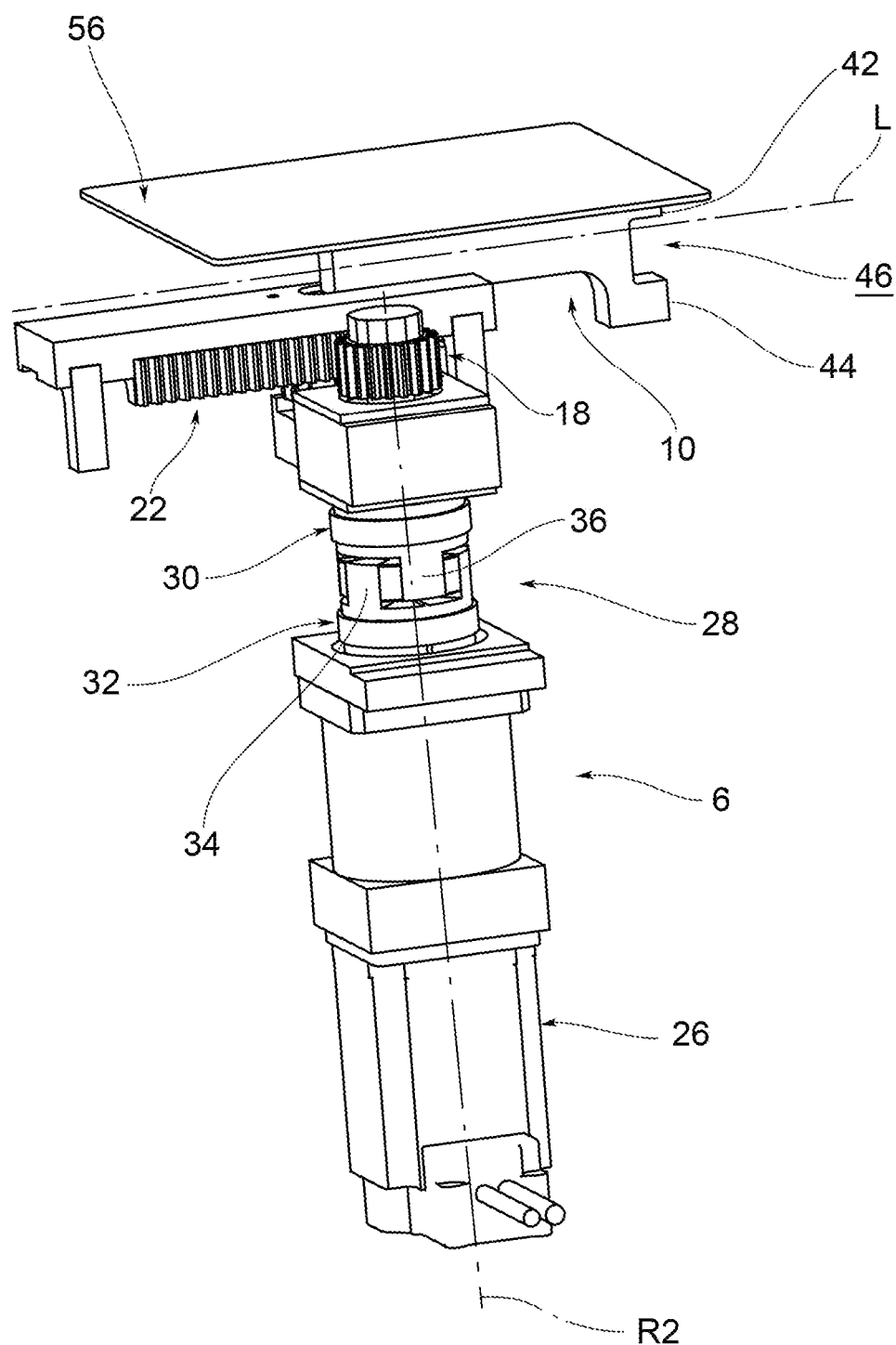
FIG. 7 shows a perspective view of the second drive means, the transmission and a holding member in an end-of-stroke position, specifically in a release configuration.
Figure 8:
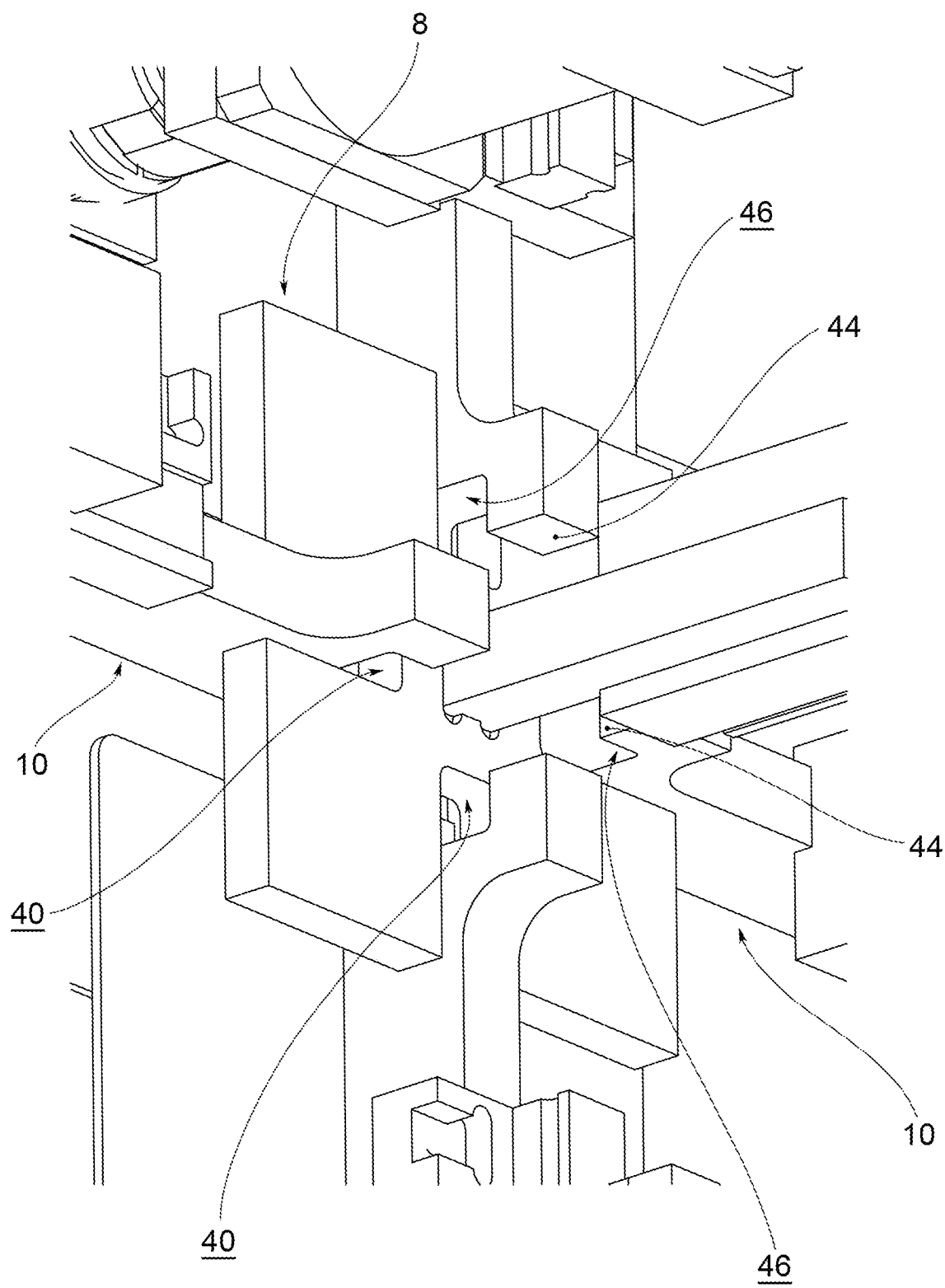
FIG. 8 illustrates a view from below the working plane, wherein the positive mechanical engagement between the platform and at least one holding member is clearly visible.

In accordance with an embodiment, a second pinion 18 of the second drive means 6 (for example, see FIG. 7) engages a second rack 22 fixed to the movable holding member 10.

In accordance with an embodiment, a drive unit 24, 26 of the first drive means 4 and/or of the second drive means 6 is connected to the pinion (16 and/or 18) by a joint element 28 made of at least two separable half-joints 30, 32, for example separable in a direction parallel to the axis of rotation R1, R2 of the respective drive shaft.

In accordance with an embodiment, the half-joints 30, 32 comprise front coupling teeth 34, 36. In other words, these teeth 34, 36 are configured to achieve a positive mechanical engagement so as to make the half-joints 30, 32 integral in rotation, and advantageously to allow a separation parallel to the axis of rotation R1, R2.

In accordance with an embodiment, the support platform 8 and at least one movable holding member 10 are counter-shaped to penetrate one another at the gripping plane 12 and/or at a support plane of that platform 8. In this way, the holding configuration of the holding member 10 may be reached also for an article A of smaller dimensions with respect to an outer perimeter P of the support platform 8.

More precisely, even if this article had a support base on the narrow support platform (and therefore spaced away from the outer perimeter P, a secure hold would still be possible by virtue of the wedging described also for articles of low height (away from the platform) for which it is not possible to attempt a hold at a greater distance from the platform.

In accordance with an embodiment, the support platform delimits a platform surface 38 circumscribed by an outer perimeter P, and delimits in its thickness one or more radial grooves 40 that develop internally from this perimeter P.

In accordance with an embodiment, each radial groove is configured to accommodate slidably the movable holding member 10, so that the support platform 8 and the holding member 10 may penetrate one another at least in the holding configuration.

In accordance with an embodiment, the movable holding member 10 delimits at least one abutment surface 42, 44 with the article A, and at least one radial recess 46 that develops outwards from the abutment surface 42, 44.

In accordance with an embodiment, the radial recess 46 is configured to accommodate at least part of the thickness of the support platform 8 so that this support platform 8 and the holding member 10 may penetrate one another at least in the holding configuration.

In accordance with an embodiment, the holding member 10 delimits at least one pair of abutment surfaces 42, 44, separated (specifically: in the axial direction) by the radial recess 46.

In accordance with an embodiment, the pair of abutment surfaces 42, 44 is substantially coplanar.

In accordance with an embodiment, the gripping machine comprises at least one working plane 48, supported by the machine frame 2 and delimiting a plane opening 50 at least partially overlapping the gripping plane or space 12 in the axial direction.

In accordance with different embodiments, the plane opening 50 could be arranged substantially centrally or laterally to the working plane 48.

In accordance with different embodiments, the support platform 8 is arranged at a lower surface 52 than the working plane 48 and has a stroke selected so as to move the article A through the plane opening 50, in position facing an upper surface 54 of the working plane.

In accordance with an embodiment, at least one movable holding member 10 is connected to at least one protective element 56, integral in the movement of this device 10 between the configurations described.

In accordance with an embodiment, the protective element 56 is radially rearward with respect to an abutment surface 42, 44 of the holding member 10 with the article A, so that only the member 10 (and in particular this surface 42, 44) comes in abutment with the article A in the holding configuration.

In accordance with an embodiment, a plurality of different holding members 10 and protective elements 56 are movable to superimpose the plane opening 50 along working directions L converging with each other.

In accordance with an embodiment, the protective elements 56 develop in non-coplanar planes (i.e.: axially offset) so as to avoid mechanical interference between these elements 56.

In accordance with an embodiment, one or more holding members 10 are movable in a plane substantially coinciding with an upper surface 54 of the working plane 48.

In accordance with an embodiment, the working plane 48 delimits in its thickness at least one member passage 60 wherein a respective holding member 10 is movable or displaceable.

In accordance with an embodiment, the member passage 60, or a plurality of such passages 60, ends and develops away from the plane opening 50.

In accordance with an embodiment, the protective element 56 develops from the holding member 10 over a surface large enough to superimpose the member passage 60, so as to cover it, in any configuration of the holding member.

Innovatively, the machine of the present invention makes it possible to solve the drawbacks reported with respect to the prior art.

More precisely, this machine allows one to position and hold articles having a high degree of diversity between them, which, according to the prior art, involve a great deal of difficulty in management and imply inevitable slowdowns in the work.

Advantageously, the machine of the present invention allows articles to be processed that are geometrically irregular or have characteristics which require holding members to be moved in a differentiated manner.

Advantageously, the machine of the present invention may be simplified structurally and functionally, for example in the case wherein the movements of the holding members must be symmetrical.

Advantageously, in the machine of the present invention it is possible to grip articles of both large and small dimensions with respect to the support surface of the platform.

Advantageously, the machine of the present invention has been designed to allow the operators working on the machine to work safely.

Advantageously, the machine of the present invention has a minimum encumbrance outside the working plane, so as to leave free space for the operators to maneuver.

Advantageously, the machine of the present invention allows for a rapid replacement of the drive means, and for the use of components from different manufacturers.

Advantageously, the machine of the present invention may be easily reconfigured, for example to carry out different types of holds.

Advantageously, a database of articles could be saved in the machine of the present invention, so as to provide precise and repeatable adjustments in the event of an article change.

To the embodiments of the aforesaid machine, a person skilled in the art, in order to meet specific needs, might introduce variants or substitutions of elements with other functionally equivalent ones.

These variations are likewise contained within the scope of protection as defined by the following claims.

Moreover, each variant described as belonging to a possible embodiment may be implemented independently of the other variants described.

The invention claimed is:

1. A gripping machine for an article, comprising:
a machine frame;
first and second drive means associated with said machine frame;
a support platform of the article, movable with respect to the machine frame by the first drive means along a direction of displacement;
holding members, suitable to delimit therebetween a gripping plane or space of the article, at least one holding member of said holding members being movable by the second drive means between a holding configuration and a release configuration of the article, and vice versa;
wherein
said holding members are arranged about the direction of displacement;
said at least one holding member of said holding members is movable only radially with respect to said direction of displacement; and wherein
electronic control means are configured to control the first drive means so that the support platform is located at one or more predefined axial positions, and to control the second drive means so that, in the holding configuration, said at least one holding member is moved continuously towards the article to actively clamp the article.

2. The gripping machine of claim 1, wherein:
said at least one holding member movable only radially with respect to said direction of displacement is replaced by at least two holding members movable in directions converging with each other;
or wherein
said at least one holding member movable only radially with respect to said direction of displacement is two holding members movable in radial directions converging with each other;
or wherein
said at least one holding member movable only radially with respect to said direction of displacement is two holding members movable in directions radial and orthogonal with each other;
and/or wherein
in the holding configuration, at least part of the holding members is in abutment with a surface of the article, and wherein active clamping is carried out by exercising an uninterrupted pressure of the holding member movable on said surface, initiated by the second drive means.

3. The gripping machine of claim 1, wherein the electronic control means are configured to detect the holding configuration of the article based on the current consumed by the second drive means.

4. The gripping machine of claim 1, comprising a plurality of holding members each moved by its own second drive means, wherein the electronic control means are configured to independently control a plurality of second drive means, so that a stroke of each holding member between the release configuration and the holding configuration is individually adjustable.

5. The gripping machine of claim 1, comprising a plurality of movable holding members, wherein the electronic control means are configured to control the second drive means in a relationship of mutual dependence, so that the stroke of the holding members between the release configuration and the holding configuration is symmetrical with respect to the direction of displacement or with respect to a plane of symmetry accommodating said direction of displacement.

6. The gripping machine of claim 1, wherein one or more holding members are mounted movable with respect to the machine frame along radial working directions.

7. The gripping machine of claim 1, wherein the first drive means comprise a first drive shaft rotatable about a first axis of rotation oriented radially or tangentially with respect to the direction of displacement, and wherein one or more second drive means comprise a second drive shaft rotatable about a second axis of rotation oriented parallel to the direction of displacement.

8. The gripping machine of claim 1, wherein the first and/or second drive means comprise at least one transmission with a rack and pinion kinematic mechanism.

9. The gripping machine of claim 8, wherein a drive unit of the first and/or second drive means is connected to the pinion by a joint element made of at least two separable half-joints, comprising front coupling teeth.

10. The gripping machine of claim 1, wherein the support platform and at least one movable holding member are counter-shaped to penetrate one another at the gripping plane or space and/or in a support plane of said support platform, so that the holding configuration of said holding member may is reachable for an article of smaller dimensions with respect to an outer perimeter of said support platform.

11. The gripping machine of claim 1, wherein:
the support platform delimits a platform surface circumscribed by the outer perimeter and delimits in its thickness one or more radial grooves that develop internally from said outer perimeter, each radial groove being configured to accommodate the movable holding member; and/or
the movable holding member delimits at least one abutment surface with the article, and at least one radial recess that develops from the at least one abutment surface outwards and is configured to accommodate at least part of the thickness of the support platform
so that the support platform and the holding member penetrate one another at least in the holding configuration.

12. The gripping machine of claim 1,
wherein said gripping machine comprises at least one working plane supported by the machine frame and delimiting a plane opening or hole (50) at least partially overlapping the gripping plane or space;
and wherein the support platform is arranged at a lower height or lower surface than the working plane and has a stroke selected so as to move the article through the plane opening or hole;
and wherein a plurality of different holding members is movable along convergent working directions;
or wherein
said gripping machine comprises at least one working plane supported by the machine frame and delimiting a plane opening or hole at least partially superimposed on the gripping plane or space in axial direction, wherein the direction of displacement is vertical and wherein the support platform is arranged at a lower surface of the working plane and has a stroke selected so as to move the article through the plane opening or hole, in a position facing an upper surface of the working plane.

13. The gripping machine of claim 1, wherein at least one movable holding member is connected to at least one protective element, integral in movement of said at least one movable holding member between said holding and release configurations.

14. The gripping machine of claim 13, wherein the at least one protective element is radially rearward with respect to the abutment surface of the holding member with the article, so that only said holding member comes in abutment with the article in the holding configuration.

15. The gripping machine of claim 13,
wherein said gripping machine comprises at least one working plane, supported by the machine frame and delimiting a plane opening or hole at least partially overlapping the gripping plane or space;
and wherein the support platform is arranged at a lower height or lower surface than the working plane and has a stroke selected so as to move the article through the plane opening or hole;
and wherein a plurality of different holding members is movable along convergent working directions;
or wherein
said gripping machine comprises at least one working plane, supported by the machine frame and delimiting a plane opening or hole at least partially superimposed on the gripping plane or space in axial direction, wherein the direction of displacement is vertical and wherein the support platform is arranged at a lower surface of the working plane and has a stroke selected so as to move the article through the plane opening or hole, in a position facing an upper surface of the working plane,
wherein a plurality of different holding members and protective elements is movable to superimpose said plane opening or hole along converging working directions, and wherein the protective elements develop in non-coplanar planes, offset axially, so as to avoid mechanical interference between said protective elements.

16. The gripping machine of claim 1, comprising at least one working plane supported by the machine frame, wherein one or more holding members are movable in a plane coinciding with the upper surface of the working plane, and wherein the working plane delimits in its thickness one or more member passages in which a respective holding member is movable or displaceable.

* * * * *